US008868586B2

(12) United States Patent  
Toebes

(10) Patent No.: US 8,868,586 B2
(45) Date of Patent: *Oct. 21, 2014

(54) GENERATING SEARCH RESULTS BASED ON DETERMINED RELATIONSHIPS BETWEEN DATA OBJECTS AND USER CONNECTIONS TO IDENTIFIED DESTINATIONS

(75) Inventor: John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,037

(22) Filed: Jun. 19, 2012

(65) Prior Publication Data

US 2012/0265752 A1    Oct. 18, 2012

Related U.S. Application Data

(63) Continuation of application No. 13/005,944, filed on Jan. 13, 2011, now Pat. No. 8,224,833, which is a continuation of application No. 11/288,275, filed on Nov. 29, 2005, now Pat. No. 7,895,223.

(51) Int. Cl.
*G06F 7/00* (2006.01)
*G06F 17/30* (2006.01)

(52) U.S. Cl.
CPC .... *G06F 17/30864* (2013.01); *G06F 17/30964* (2013.01)
USPC ........... 707/758; 707/736; 707/748; 707/751; 709/224

(58) Field of Classification Search
CPC ................ G06F 17/30864; G06F 17/30964
USPC ................... 707/758, 736, 748, 751; 709/224
See application file for complete search history.

(56) References Cited

U.S. PATENT DOCUMENTS

| 5,583,763 | A | 12/1996 | Atcheson et al. |
| 5,684,514 | A | 11/1997 | Branscomb |
| 5,963,914 | A | 10/1999 | Skinner et al. |
| 6,134,532 | A | 10/2000 | Lazarus et al. |
| 6,377,944 | B1 | 4/2002 | Busey et al. |
| 6,480,862 | B1 | 11/2002 | Gall |
| 6,490,577 | B1 | 12/2002 | Anwar |
| 6,526,440 | B1 | 2/2003 | Bharat |
| 6,615,209 | B1 | 9/2003 | Gomes et al. |

(Continued)

FOREIGN PATENT DOCUMENTS

EP    1 076 304 A1    2/2001

*Primary Examiner* — Shew-Fen Lin
(74) *Attorney, Agent, or Firm* — Leon R. Turkevich

(57) ABSTRACT

A search system generates an ordered list of destination targets including identified individuals and data objects, based on applying a user context to an information context and to a connection context. The user context identifies a search context (i.e., the information the user is seeking) relative to an identity of the user, and the information context identifies destinations accessible by the user, including data objects and communications-based actions (e.g., voice over IP telephony calls, instant messaging session transcripts, etc.). The connection context identifies relationships between chosen destinations throughout the system, and the strength of those relationships determined from artifacts of the chosen destinations: the connection context is updated based on artifact detection. The portion of the connection context that is relevant to the user context is used to order the portion of the information context that is relevant to the user context, resulting in the ordered list of destination targets.

17 Claims, 7 Drawing Sheets

(56) References Cited

U.S. PATENT DOCUMENTS

| | | |
|---|---|---|
| 6,640,230 B1 | 10/2003 | Alexander et al. |
| 6,658,423 B1 | 12/2003 | Pugh et al. |
| 6,678,681 B1 | 1/2004 | Brin |
| 6,681,247 B1 * | 1/2004 | Payton .................... 709/217 |
| 6,697,800 B1 | 2/2004 | Jannink et al. |
| 6,721,726 B1 | 4/2004 | Swaminathan et al. |
| 6,725,259 B1 | 4/2004 | Bharat |
| 6,727,927 B1 | 4/2004 | Dempski et al. |
| 6,760,694 B2 | 7/2004 | Al-Kazily et al. |
| 6,910,135 B1 | 6/2005 | Grainger |
| 6,934,634 B1 | 8/2005 | Ge |
| 6,934,747 B1 | 8/2005 | McGrath et al. |
| 6,983,379 B1 | 1/2006 | Spalink et al. |
| 7,003,522 B1 | 2/2006 | Reynar et al. |
| 7,181,438 B1 | 2/2007 | Szabo |
| 7,343,365 B2 | 3/2008 | Farnham et al. |
| 7,395,395 B2 | 7/2008 | Roden et al. |
| 7,505,959 B2 | 3/2009 | Kaiser et al. |
| 7,610,279 B2 | 10/2009 | Budzik et al. |
| 7,617,199 B2 | 11/2009 | Budzik et al. |
| 7,707,284 B2 | 4/2010 | Friedman et al. |
| 7,895,223 B2 | 2/2011 | Toebes |
| 7,912,941 B2 | 3/2011 | Toebes |
| 8,224,833 B2 | 7/2012 | Toebes |
| 2002/0059201 A1 | 5/2002 | Work |
| 2002/0065802 A1 | 5/2002 | Uchiyama |
| 2002/0107843 A1 | 8/2002 | Biebesheimer et al. |
| 2002/0123988 A1 | 9/2002 | Dean et al. |
| 2002/0188589 A1 | 12/2002 | Salmenkaita et al. |
| 2003/0004937 A1 | 1/2003 | Salmenkaita et al. |
| 2003/0158855 A1 * | 8/2003 | Farnham et al. .............. 707/102 |
| 2003/0229900 A1 * | 12/2003 | Reisman ...................... 725/87 |
| 2003/0233419 A1 | 12/2003 | Beringer |
| 2004/0030709 A1 | 2/2004 | Smith |
| 2004/0059708 A1 | 3/2004 | Dean et al. |
| 2004/0119740 A1 | 6/2004 | Chang et al. |
| 2004/0148237 A1 | 7/2004 | Bittmann et al. |
| 2004/0153436 A1 | 8/2004 | Pope et al. |
| 2004/0261021 A1 | 12/2004 | Mittal et al. |
| 2004/0267729 A1 | 12/2004 | Swaminathan et al. |
| 2005/0149499 A1 | 7/2005 | Franz et al. |
| 2005/0149851 A1 | 7/2005 | Mittal |
| 2005/0188318 A1 | 8/2005 | Tamir et al. |
| 2005/0197995 A1 | 9/2005 | Badt et al. |
| 2005/0203963 A1 | 9/2005 | Werner |
| 2005/0209844 A1 | 9/2005 | Wu et al. |
| 2005/0246588 A1 | 11/2005 | Deng et al. |
| 2005/0289463 A1 | 12/2005 | Wu et al. |
| 2006/0059225 A1 * | 3/2006 | Stonehocker et al. ........ 709/202 |
| 2006/0069675 A1 | 3/2006 | Ogilvie |
| 2006/0101077 A1 | 5/2006 | Warner et al. |
| 2006/0242554 A1 | 10/2006 | Gerace et al. |
| 2007/0005587 A1 | 1/2007 | Johnson et al. |
| 2007/0033166 A1 | 2/2007 | Trowbridge et al. |
| 2007/0033340 A1 | 2/2007 | Tulskie et al. |
| 2007/0067292 A1 | 3/2007 | Trowbridge et al. |
| 2007/0076728 A1 | 4/2007 | Rieger et al. |
| 2008/0046590 A1 | 2/2008 | Surazski et al. |
| 2008/0059419 A1 | 3/2008 | Auerbach et al. |
| 2008/0097822 A1 | 4/2008 | Schigel et al. |

* cited by examiner

GENERATING SEARCH RESULTS BASED ON DETERMINED RELATIONSHIPS BETWEEN DATA OBJECTS AND USER CONNECTIONS TO IDENTIFIED DESTINATIONS

This application is a continuation of commonly-assigned, copending U.S. application Ser. No. 13/005,944, filed Jan. 13, 2011, which is a continuation of U.S. application Ser. No. 11/288,275, filed Nov. 29, 2005 and issued as U.S. Pat. No. 7,895,223 on Feb. 22, 2011.

BACKGROUND OF THE INVENTION

1. Field of the Invention

The present invention relates to search systems. In particular, the present invention relates to systems such as web-based search resources that respond to a request for information by presenting to a user an ordered list of likely search results that enable a user to reach a desired destination.

2. Description of the Related Art

Businesses and organizations spend substantial resources on an annual basis in order to employ information systems that improve the availability and accessibility of information relevant to specific needs. Early information systems focused on database management schemes, where information was stored and classified using database management systems in order to obtain search results in response to specific database queries. Exemplary database management system vendors have included Oracle Corporation, IBM Informix®, Sybase®, Microsoft (e.g., Access and SQL Server) etc. Such database management systems, however, required some knowledge of the database query syntax, the organizational structure of the database, and knowledge of the available search keys for performing a database query. Hence, the earlier database management systems required some user expertise, rendering such systems less user friendly for less experienced users.

More recent search technologies have employed a web-based search model, where corporate directories can be searched using a web-based search model. For example, companies such as IBM, Google, and X1 have created context search engines which consolidate and present data based on user queries. For example, FIG. 1A is a diagram of a web page 10a displaying a search result 12a in response to a search query 14a utilizing search technology available from Google, Inc., for example at the website address "maps.google.com". As illustrated in FIG. 1A, the search result 12a is displayed in the form of a location on a map, where the location is determined based on applying the search query 14a to a map database (illustrated on the web page 10a as originating from NAVTEQ™). The web page 10a includes additional search links 16a, 16b that enables a user to further refine the search, for example by entering a business type as a secondary query 14b in order to identify secondary search results 12b, illustrated in FIG. 1B, that are based on the context of the primary search results 12a.

Consequently, a particularly advantageous feature of existing search technologies is the availability of applying context information that reorders priorities of information as usage patterns of the search results change. In addition, existing search technologies utilize information reputation, where user selection in response to a search query is sent as a feedback mechanism to the search engine to assist the search engine as identifying the user selection as a "better response" to the search query.

A fundamental deficiency of the above-described search technologies is that the search technology performs a search of stored data such as database records or static web objects. However, a fundamental component of business operations involves identifying and locating individuals who are able to solve a relevant business problem. Businesses invariably rely on individual persons (or groups of persons) who are recognized as being experts on a given business matter. For this reason businesses and other organizations establish management hierarchies and organizational structures in order to classify individual persons as being associated with or experts on a given business matter.

Consequently, software-based systems have been developed to improve the ability of businesses and other organizations to provide reliable techniques for storing the classification of individual persons relative to business matters. For example, software applications known as contact managers have been used in order to enable an individual to maintain records of individuals and their respective attributes. Contact manager programs, such as Microsoft® Office Outlook® from Microsoft Corp. and Palm® desktop from Palm Source, Inc., enable an individual user to maintain contact records of persons deemed relevant by the user (i.e., contacts), each record enabling the user to input and store the corresponding information related to the contact such as telephone number, address, e-mail, and notes related to the contact. The contact managers also include search capabilities, enabling the user to identify a contact based on entering a search query. In all cases, however, the contact manager applications require manual input of data for the contacts, with limited group sharing based on the system.

As apparent from the foregoing, however, if there is no explicit reference to the individual as being relevant to a given business problem (e.g., for example based on an organizational chart or in a contact manager), the ability to identify that individual as being essential to solving a given business problem may not be known without collective knowledge within the business. Hence, problem solving techniques within a business often may begin with announcements (e.g., mass e-mails) inquiring if anyone knows a person knowledgeable on the given business problem.

Another form of a contact manager is present in call center applications, where a business such as a customer support center integrates all of its operations into a single system which monitors calls, transactions, and integrates the transactions within a knowledge database. This variation of a database system, however, typically relies on a highly structured database, and therefore does not really apply itself to general business cases where an employee is attempting to find an expert for a given business issue.

Hence, existing technologies have concentrated either on user information (e.g., database or web searching), or user communications (e.g., identifying attributes of a contact or an incoming calling party at a call center).

SUMMARY OF THE INVENTION

In view of the foregoing, there is a need for an arrangement that integrates the context-based search abilities of existing search technologies, with contact-based technologies that identify contacts that are responsible for information, or that identify historical transactions associated with an individual. In particular, there is a need for an arrangement that enables context-based searching to be performed not only based on searching for relevant data objects, but also based on searching user associations having been established based on prior transactions among users.

In other words, every action performed by an individual can be viewed as a transaction that may establish an association between seemingly unrelated objects, for example the individual viewing a document and immediately thereafter initiating a phone call to a destination party. If the transactions of viewing the document for a given length of time and placing the phone call to the destination party for another length of time can be recorded as respective artifacts of the individual acts, including any time interval between viewing the document and initiating the phone call, then over time the evaluation of multiple artifacts relative to viewing the document and placing phone calls to that same destination party may establish a strong correlation between the specific document and the destination party. Consequently, it would be highly desirable that such a strong correlation between the specific document and the destination party would be reflected in any search for the specific document, enabling the user performing a search query to learn of the strong correlation of the destination party to the specific document.

Hence, there is a need for an arrangement that enables a system to perform searches not only based on existing data objects (e.g., database entries, web objects, etc.), but also based on artifacts that represent human decisions in creating and establishing associations between existing data objects and individuals targeted as necessary for solving a business solution.

There also is a need for an arrangement that enables a system to perform searches on behalf of the user, where the search result includes individuals having been identified by the system based on established associations between the identified individuals and searched objects; in other words, the search result includes identified individuals without the need for any prior knowledge of any of the identified individuals by the user performing the search.

These and other needs are attained by the present invention, where a search system for a user performing a search generates an ordered list of destination targets, including identified individuals and data objects, based on applying a user context to an information context identifying information and individuals reachable in the system by the user, and applying the user context to a connection context identifying relationships between chosen destinations throughout the system. The user context identifies the information the user is seeking (i.e., the search context) relative to the identity of the user, and the information context identifies destinations accessible by the user, including data objects and communications-based actions (e.g., voice over IP telephony calls, instant messaging chat session transcripts). The connection context identifies relationships at least between prior search contexts and chosen destinations (including data objects and destination addresses for individuals), and the strength of those relationships determined from artifacts of the chosen destinations. The portion of the connection context that is relevant to the user context is used to order the portion of the information context that is relevant to the user context, resulting in the ordered list of destination targets.

The connection context is established based on identifying artifacts of user actions that reflect the relationships between the chosen destinations, including chosen destinations having been chosen independent of any search result (e.g., initiating a Voice over IP Phone call, sending an e-mail message, paging message, Instant Message, etc.). A relationship also may be established between a prior search result and a chosen destinations having been identified from the prior search result. The aggregation of the artifacts determine the strength of the relationships, enabling the portion of the information context that is relevant to the user context to be ordered according to the strength of the relationships that are relevant to the user context.

Hence, the search system generates an ordered list of destination targets for the user, based on the user context and the relationships having been established between chosen destinations (as well as between prior search contexts and chosen destinations), where the destination targets include both data objects and identified individuals. Hence, organizations now can deploy search systems that automatically ascertain relationships between search contexts and individuals, providing a comprehensive solution for identifying the most valuable "destination targets" for a specific issue (the search context) customized for a specific user (the user context).

One aspect of the present invention includes a method for searching a system. The method includes receiving a user context that identifies a search context relative to an identity of a user seeking a search result. The method also includes identifying a portion of a connection context as relevant to the user context: the connection context identifies relationships between chosen destinations reachable throughout the system; each of the relationships has a strength determined from artifacts of the chosen destinations, and a subset of the artifacts identify destinations having been chosen independent of any search result. The method also includes generating as the search result an ordered list of destination targets, including selected identified individuals and selected data objects determined as relevant to the user context, including ordering the ordered list according to the portion of the connection context. Hence, the ordered list includes destination targets based on identified relationships between chosen destinations throughout the system, even if some the chosen destinations had never been accessed from a search result; consequently, the ordered list of destination targets is based on relationships, and not limited to prior search results.

Another aspect of the invention provides a method in a system providing data objects and search services to at least one user. The method includes detecting artifacts representing the user accessing chosen destinations throughout the system: the chosen destinations include data objects and address identifiers for reaching identified individuals. The method also includes updating a connection context that identifies relationships between the chosen destinations. The updating can be performed by: (1) establishing a relationship between first and second chosen destinations based on determining a correlation between the artifacts associated with the first and second destinations, or (2) updating the relationship between the first and second chosen destinations based on subsequent artifacts, associated with the first and second destinations, indicating selection by the user subsequent to the establishment of the corresponding relationship. Hence, the determination of a correlation between the artifacts establishes a relationship that can be relied on for context-based searching, where the relationship is further refined (e.g., strengthened or reduced) based on subsequent artifacts.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 2:
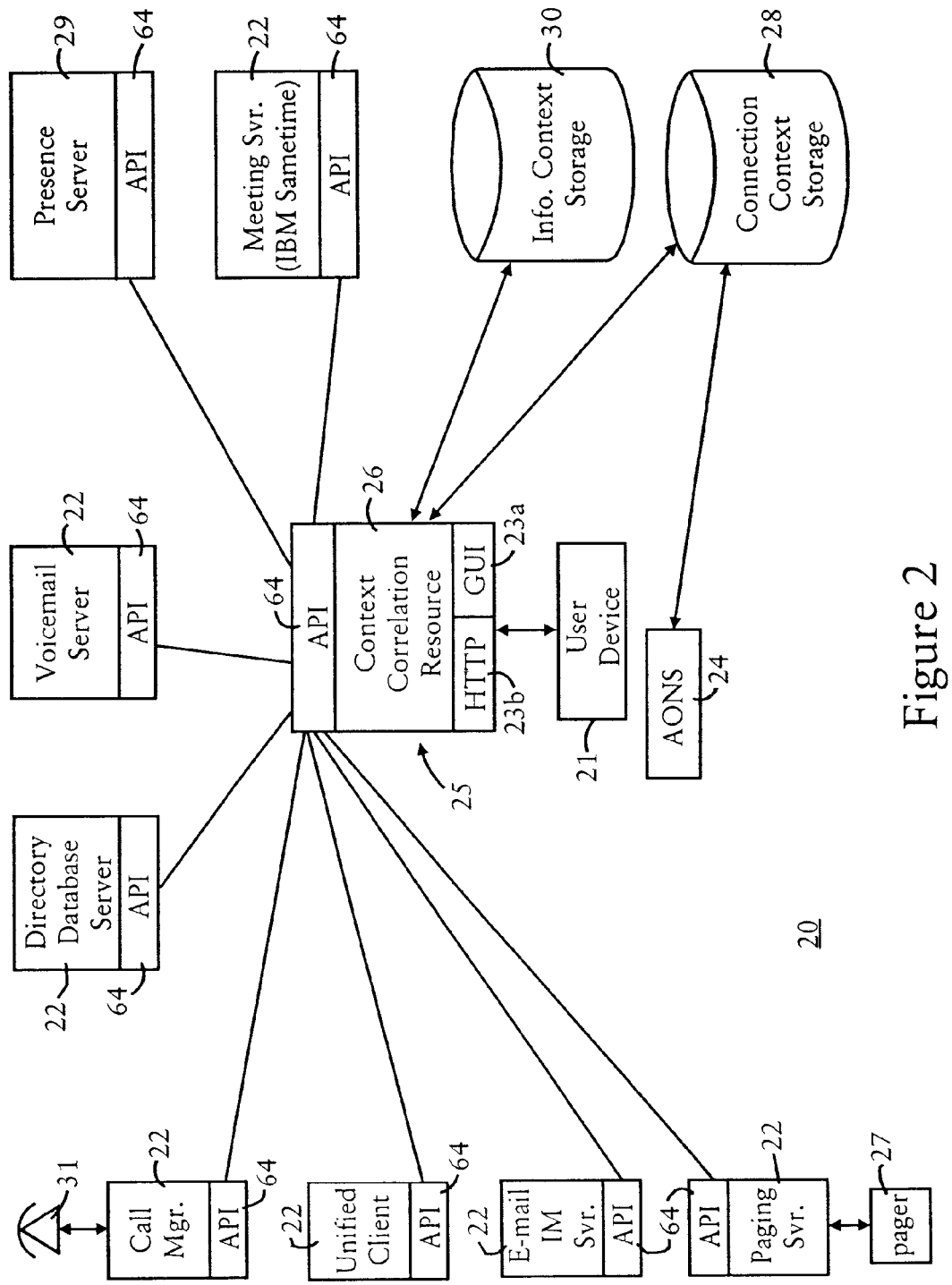
FIG. 2 is a diagram illustrating a system architecture that enables the identification of relationships between chosen destinations in the network, and generation of an ordered list of destination targets as a search result based on the identified relationships, according to an embodiment of the present invention.

FIG. 2 is a diagram illustrating a system architecture that enables the identification of relationships between chosen destinations in a network 20, and generation of an ordered list of destination targets, according to an embodiment of the present invention. The network 20 includes numerous information sources 22 configured for providing access to information for a user. The network 20 also includes a network management server 24 and a presence server 29 configured for providing services that are associated with supporting the information sources 22, described below. The network 20 also includes a context correlation resource 26, a connection context storage 28, and an information context storage 30. As described below, the context correlation resource 26 is configured for generating a search result, in response to receiving a user context from a user interface device 21 and that includes a search context relative to a user identity. The search result includes an ordered list of destination targets including identified individuals and selected data objects determined as relevant to the user context.

Figure 3:
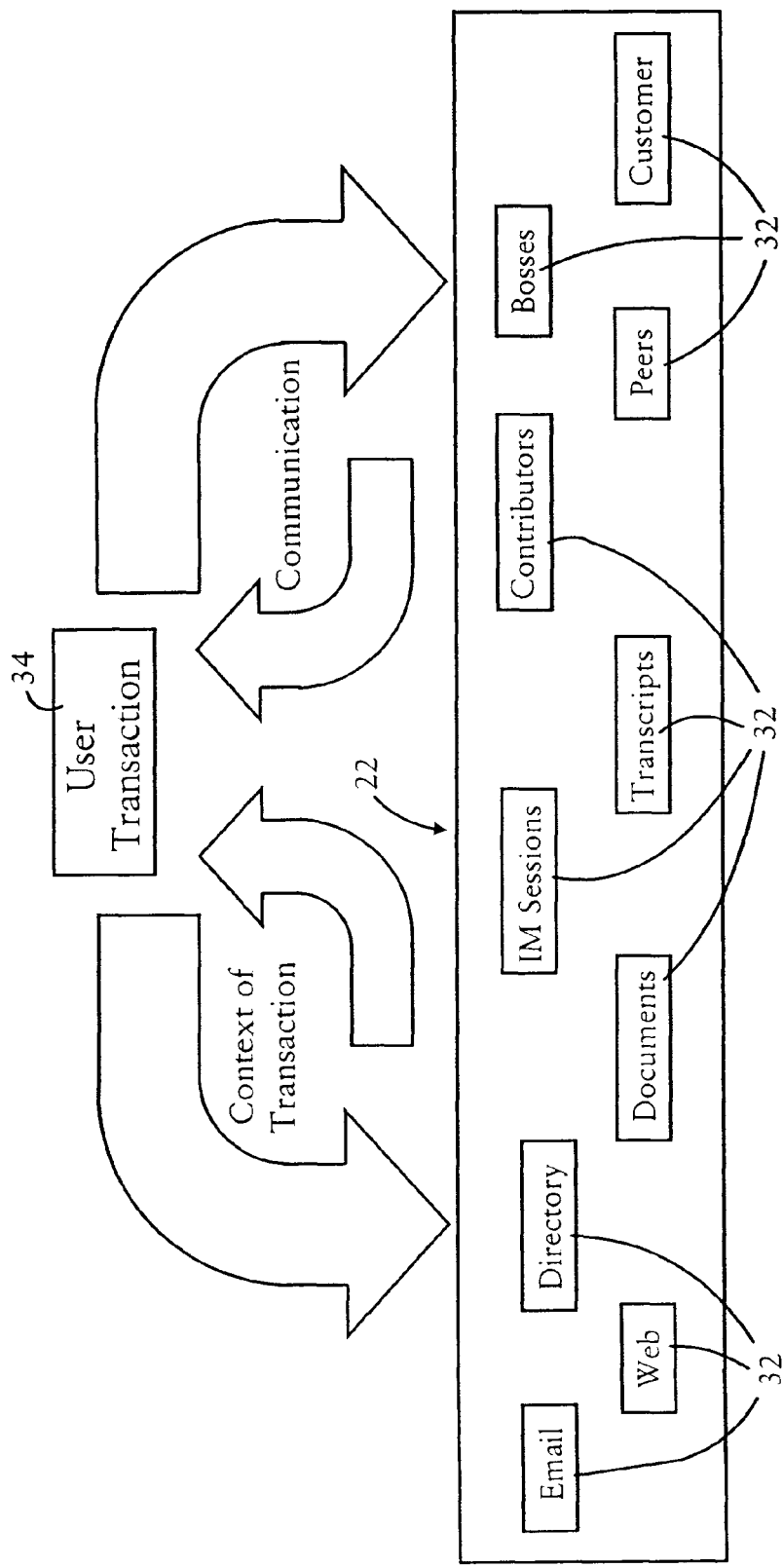
FIG. 3 is a diagram illustrating in further detail the identification of relationships between chosen destinations in the network of FIG. 2 based on user transactions and user context, according to an embodiment of the present invention.

According to the disclosed embodiment, search results are obtained based not only on information available to the user, but also on identified relationships between chosen destinations throughout the network 20, where the term "chosen destinations" refers to any destination in the network 20 (e.g., a data object, destination address for an individual via a specific device) that has been chosen (i.e., selected) for access or retrieval by a user of the network 20. As illustrated in FIG. 3, chosen destinations 32 can be in many forms, depending on the specific user transaction and the context of the transaction.

As illustrated in FIGS. 2 and 3, the information sources 22 provide various types of information to the user, depending on the user device (e.g., 21, 27, 31, etc.) and the information being requested. For example, a given information source 22 may be implemented in the form of an access server configured for providing user access to information according to a prescribed device protocol (e.g., a call manager providing network access to a wired or wireless IP telephone 31, a paging server providing network access with a pager or wireless e-mail device 27, a unified client, e-mail or instant messaging server, the meeting server, etc.); alternately the information source 22 may be implemented as an information server configured for supplying requested information to the user in response to a specific request (e.g., the directory database server, the voicemail server, transcripts or diagrams from the meeting server, e-mail messages or instant messaging transcripts from the e-mail or instant messaging server, etc.).

Figure 4:
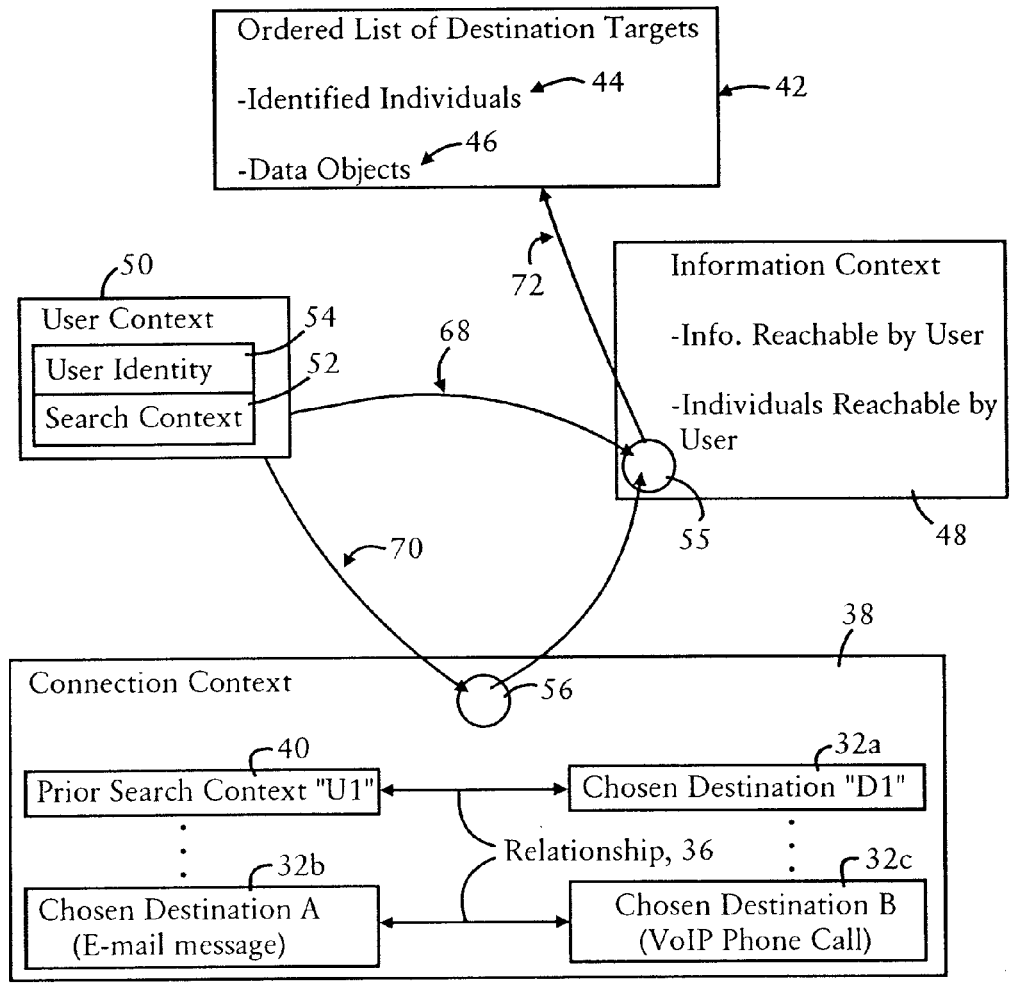
FIG. 4 is a diagram illustrating the filtering of connection context and information context, based on applying a user context, in order to obtain the ordered list of destination targets, according to an embodiment of the present invention.

As illustrated in FIGS. 3 and 4, the chosen destinations 32 are recognized to have relationships 36 among each other based on user transactions 34. In particular, user transactions can be detected in the form of artifacts (e.g., placing a phone call to a chosen destination, accessing an e-mail message as a chosen destination, accessing a web page or other web object as a chosen destination, etc.). The relationships 36 between chosen destinations 32 are established by the context correlation resource 26, or any other network element configured for monitoring network activity and identifying network relationships, such as the Application Oriented Network System (AONS) 24. An example of the AONS 24 is the commercially available Application-Oriented Network (AON) technology from Cisco Systems, Inc., including for example the commercially available Cisco Catalyst® 6500 Series AON module, and the Cisco 2600/2800/3700/3800 series AON module.

The relationships between chosen destinations 32 are established by the context correlation resource 26 or the AONS 24 based on determining a correlation between the artifacts of user actions associated with the respective destinations. As illustrated in FIG. 4, the information with respect to the relationships 36 between the chosen destinations, including identification of the chosen destinations 32, the nature of the relationship, the strength of the relationship, the quality of the relationship, etc., can be stored as metadata 38 in the connection context storage 28.

At a minimum, the context correlation resource 26 or the AONS 24 may store the connection context metadata 38 in the connection context storage 28 as tuples that identify the two related chosen destinations 32 (e.g., 32b and 32c); in this case, the correlation strength between the two related chosen destinations 32 (e.g., 32b and 32c) can be identified based on the number of times that the same tuples (e.g., 32b and 32c) are stored in the connection context storage 28; hence, the strength could be determined based on identifying the number of times that the same tuples (e.g., 32b and 32c) are stored. More sophisticated storage techniques may include the context correlation resource 26 or the AONS 24 storing metadata in the connection context storage 28 that includes multiple fields, for example the chosen destination identifiers, the strength of the relationship 36 using a prescribed quantifiable metric, as well as any attributes that identify the nature in which the chosen destinations were accessed (e.g., search context, access device attributes, user attributes, etc.). As described below, the connection context 38 may include metadata that identifies the relationship 36 between a prior search context 40 and a chosen destination 32a resulting from the corresponding search result.

The relationships 36 are continually updated by the context correlation resource 26 or the AONS 24 based on subsequent detected artifacts that indicate the relative strength of the relationship. The subsequent detected artifacts may be based on independent events such as accessing an e-mail followed by initiating a telephone call (e.g., in the case of chosen destinations 32b and 32c), or may be based on refining a prior search context 40 by a user refining his or her search to a more precise context to narrow a prior search.

Hence, the connection context storage 28 includes metadata that identifies the connection context 38 of the chosen destinations 32, namely the relationships between the chosen destinations 32 that are reachable throughout the system 20. The connection context 38 includes both the relationships 36 of chosen destinations 32b, 32c that are independent of any search result, as well as the relationships 36 between prior search results 40 and chosen destinations 32a resulting from the search result.

As illustrated in FIG. 4, the context correlation resource 26 is configured for generating a search result 42 based on identifying selected identified individuals 44 and selected data objects 46 from an information context 48. In particular, the context correlation resource 26 receives a user context 50 that includes a search context 52 and a user identity 54. The term "user context" refers to a search context 52 that is relative to the identity 54 of the user seeking a search result.

Figure 1A:
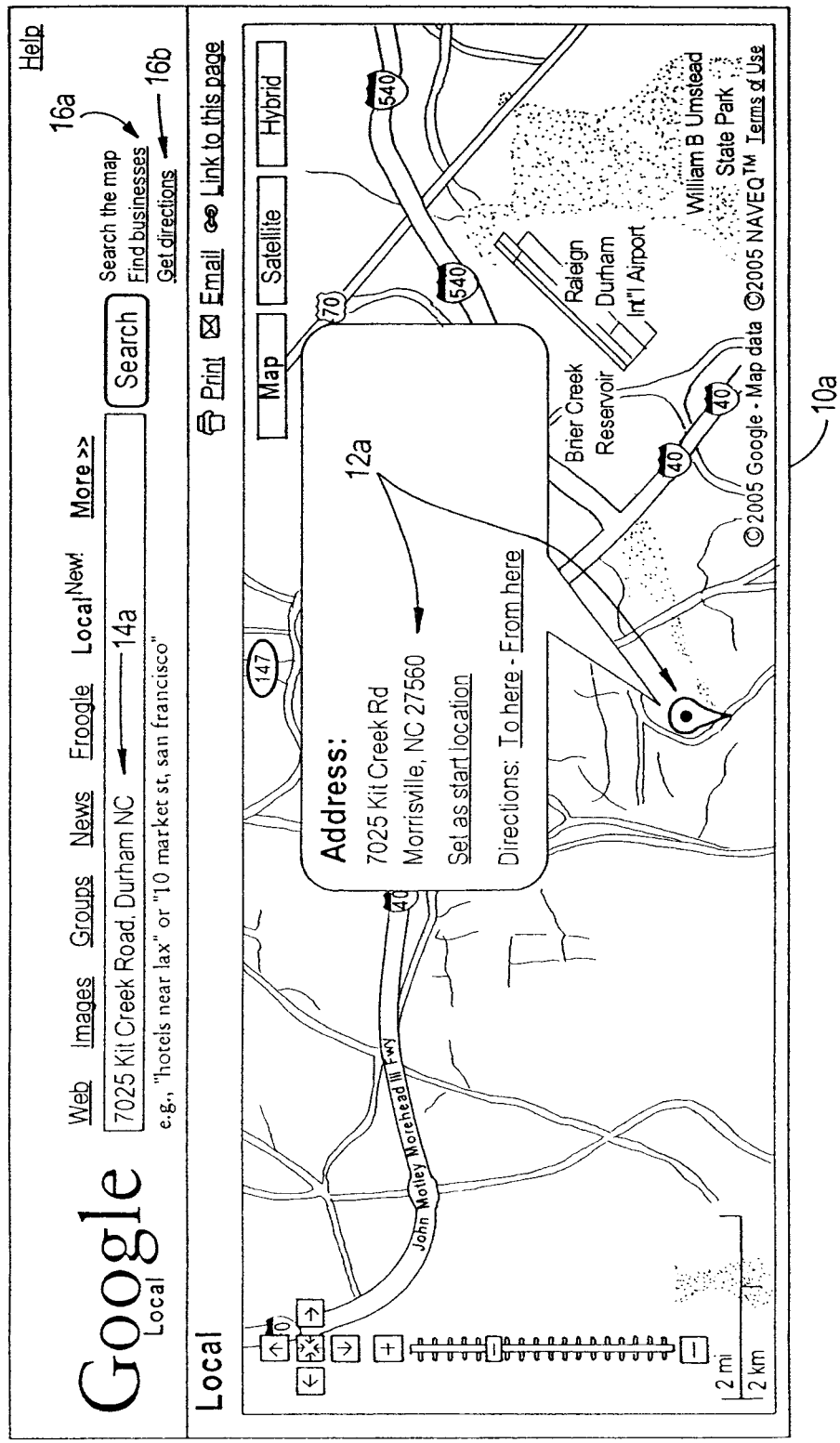
FIGS. 1A and 1B are diagrams illustrating web page search results from conventional (prior art) search techniques.
Figure 1B:
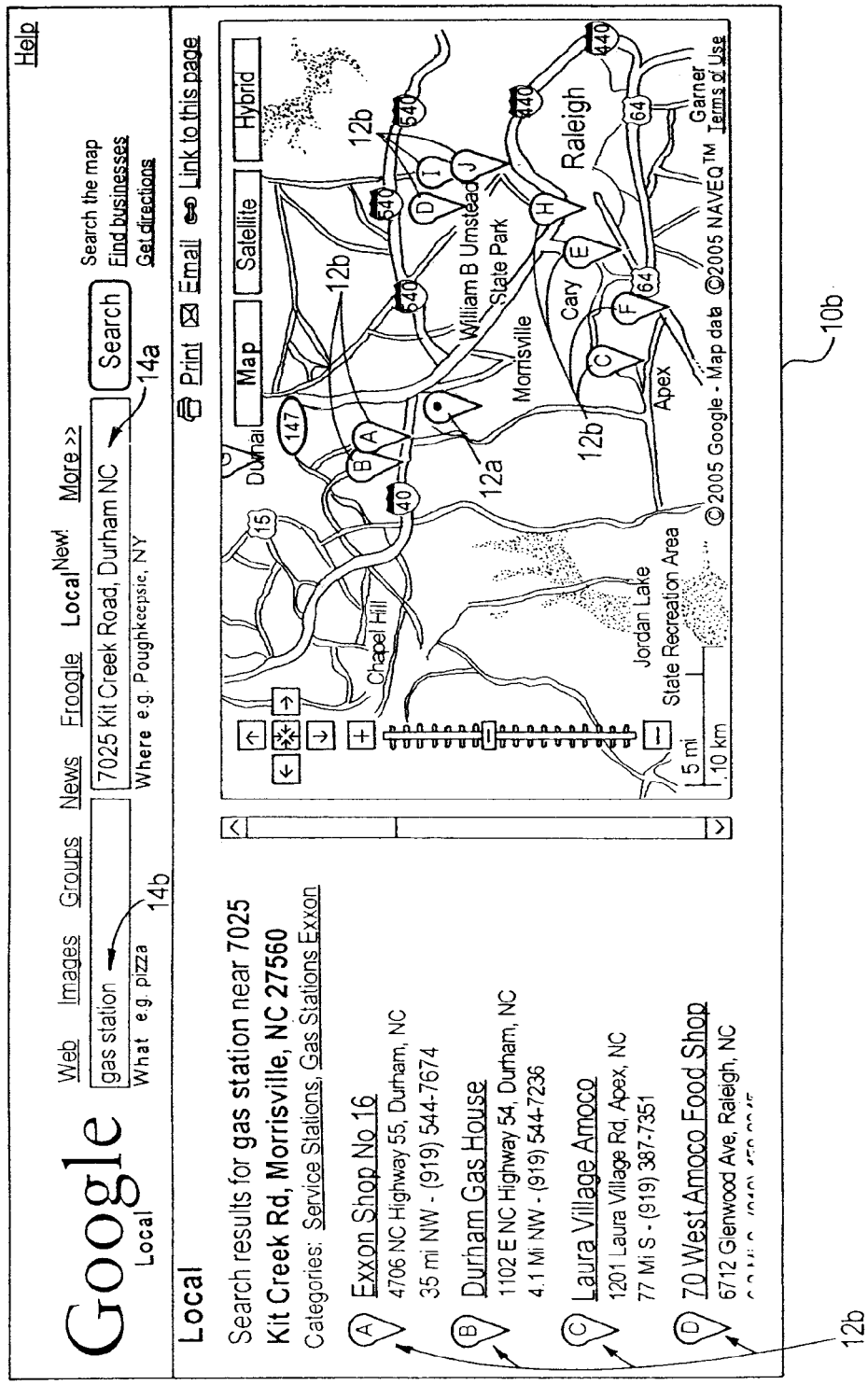

The connection context resource 26 is implemented as executable code that is executed by a processor within a processor-based device 25. One exemplary implementation would involve a user of a keyboard or pointing device 21, having logged into the computer terminal with his or her identity 54, entering a search string 52; in this case, the context correlation resource 26 of FIG. 2 could be implemented as a locally-executable resource (e.g., Google Desktop) having a graphic user interface (GUI) 23a that enables the user to enter a search query. Another exemplary implementation of the context correlation resource 26 could involve the device 25 being implemented as a web-based search portal implemented on a web server, including an HTTP interface 23b that enables a registered user to send an HTTP post that includes the search context 52, for example as illustrated with respect to FIGS. 1A and 1B: the user identity 54 may accompany the HTTP post, implemented at the client device using a data structure referred to as a cookie, or implemented as a server-side data structure that determines the identity 54 of the user based on prescribed parameters (e.g., user device address, etc.).

Still another exemplary implementation of receiving a user context 50 may involve a combination of different services, for example determining a user identity 54 at a communications terminal based on presence information sent by the presence server 29 of FIG. 2: the presence server 29 may determine the identity 54 of the user at the terminal based on electronic detection of an employee badge or visitor badge worn by the user, etc. In this case, the terminal may be as simple as an electronic map offering directory or map services, or an IP Phone that permits directory queries, message access based on the presence information, etc.

Still another exemplary implementation of receiving a user context 50 may involve a third-party request 52 sent from one location with instructions to send the results 42 on behalf of the user identity 54 to the terminal in use by the user (as detected by the presence server 29).

Hence, the user context 50 identifies, relative to the identity 54 of the user, the search context 52 that describes the information that the user is seeking.

In response to receiving the user context 50, the context correlation resource 26 identifies the selected identified individuals 44 and the selected data objects 46 that are relevant to the user context 50 based on applying the user context 50 to the information context 48 stored in the information context storage 30. The information context 48 is metadata that identifies all destinations in the system 20 that are accessible by the user. In other words, the information context 48 identifies all the individuals and data objects that are accessible to the user via the various information sources 22.

The context correlation resource 26 applies the user context 50 to the information context 48 in order to identify the portion 55 of the information context 48 that is relevant to the user context 50, including the selected identified individuals 44 and the selected data objects 46. The correlation context resource 26 orders the portion 55 of the information context 48 relevant to the user context 50, described below, and presents the search results 42 as an ordered list of destination targets.

Assuming that the ordered list of destination targets 42 is presented to the user with an option to further refine the search, and the user chooses to refine the search (e.g. by narrowing the search query, or choosing a hyperlink to select "more like this"), the context correlation resource 26 receives the updated user context 50 as having an updated search context 52 that reflects the refined search. Once the user accesses a chosen destination (e.g., either by selecting a hyperlink within the ordered list of destination targets 42, or by independently initiating a Voice over IP call), the artifact of the user choosing the chosen destination 32a is stored with the most recent updated search context 52 as a prior search context 40 within the connection context 38.

As apparent from the foregoing, the prior search context 40 can include at least the search context 52 (e.g., the search string) with no attributes related to the user identity 54. The search context 52 may include various search parameters, including the search string, time of day, date, etc. Certain anonymous user attributes also may be added to the prior search context 40, for example user class (e.g., engineer, sales, management, or legal personnel), as well as user device type, device location, etc. If desired, the entire user context 50 may be stored as the prior context 40, including the user identity 54.

Hence, the connection context 38 identifies relationships between chosen destinations having been chosen independent of any search result, and relationships between chosen destinations having been a destination target within a search result 42. As described previously, the user context 50 is applied to the information context 48 in order to determine the portion 55 that is relevant to the user context 50. The user context 50 also is applied by the context correlation resource 26 to the connection context 38 in order to identify the portion 56 of the connection context 38 that is relevant to the user context 50.

Figure 6:
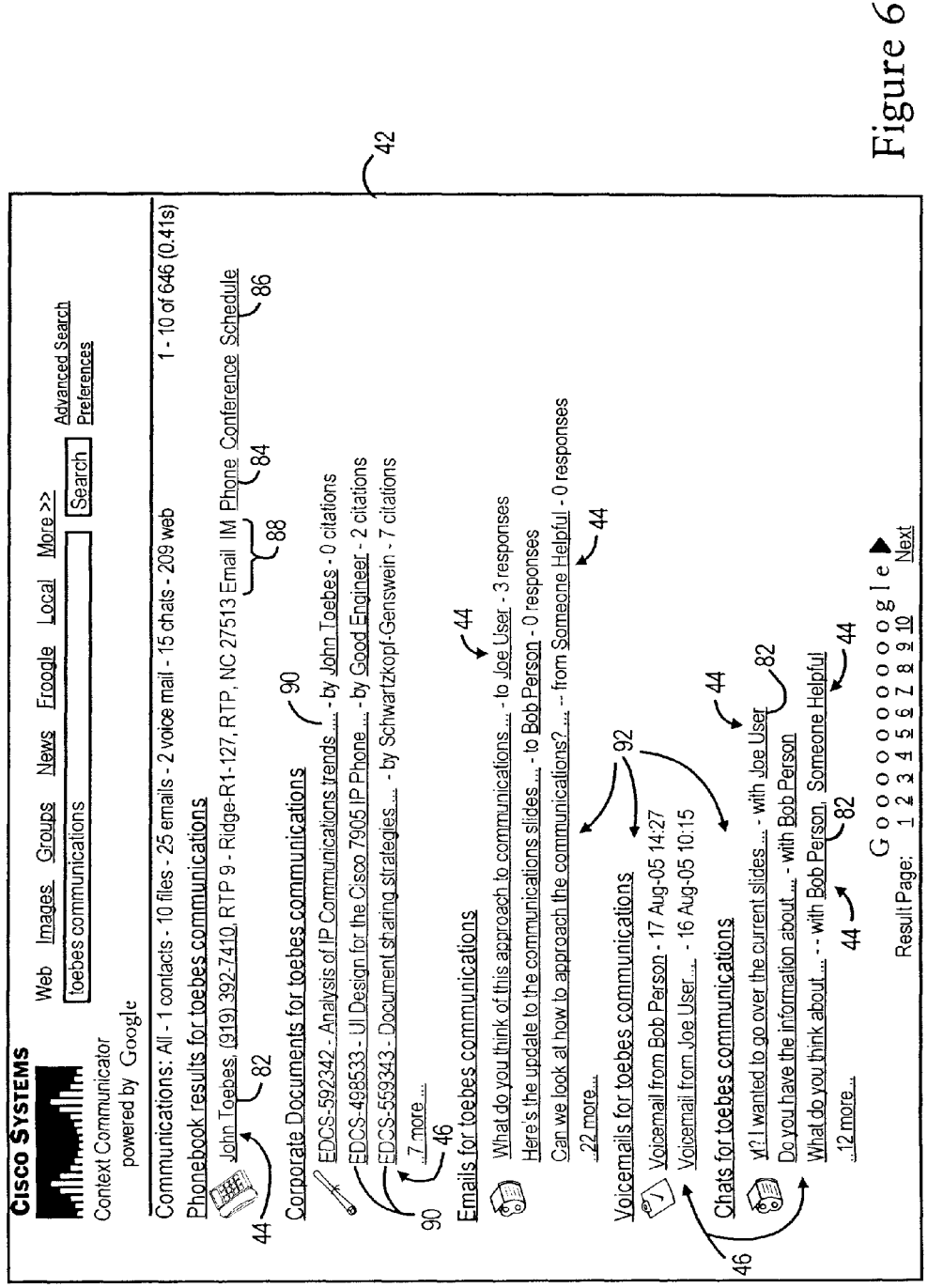
FIG. 6 is a diagram illustrating an exemplary search result in the form of a web page providing an ordered list of destination targets, according to an embodiment of the present invention.

The context correlation resource 26 orders the portion 55 of the information context 48 that is relevant to the user context, with the portion 56 of the connection context 38 that is relevant to the user context 50, in order to generate the ordered list of destination targets 42, illustrated in FIG. 6.

Figure 5:
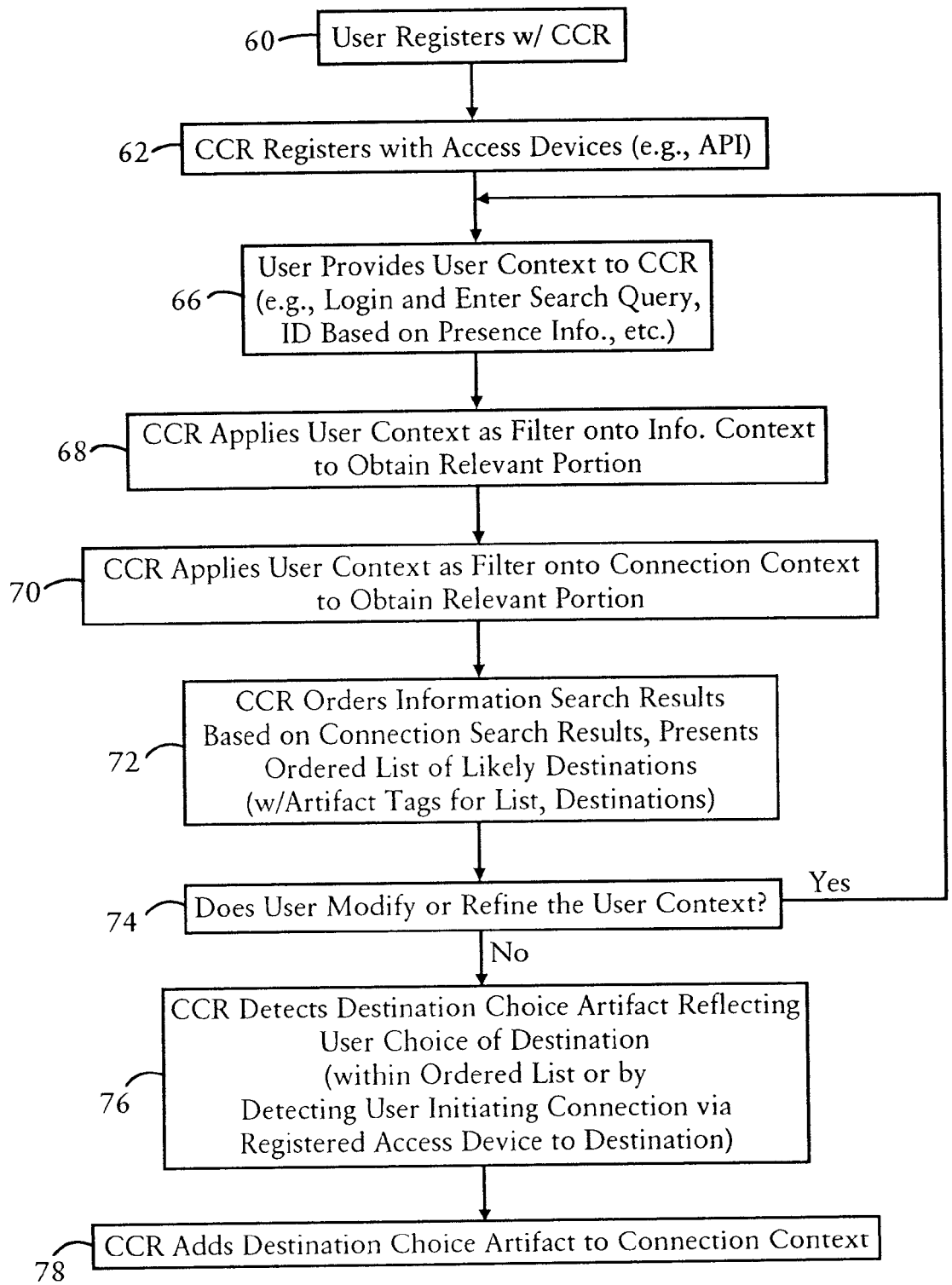
FIG. 5 is a diagram illustrating a method of obtaining the ordered list of destination targets based on a user context, according to an embodiment of the present invention.

FIG. 5 is a diagram illustrating the method of establishing relationships between chosen destinations, and generating a search result based on the determined relationships, according to an embodiment of the present invention. The steps described in FIG. 5 can be implemented as executable code stored on a computer readable medium (e.g., a hard disk drive, a floppy drive, a random access memory, a read only memory, an EPROM, a compact disk, etc.).

As described previously, a user typically registers in step 60 with the context correlation resource 26 via a user device. The registration may be active (e.g., user logs into the device executing the context correlation resource 26 with user identifier and password), or passive based on predetermined user assignment settings (e.g., user device preconfigured to be used exclusively by the user). Note, however, that registration of the user's personal identity is not necessarily required, as anonymous users also can utilize the disclosed search system. In this case, access device registration may be substituted in place of user registration, where the access device address is used to establish the "user identity" (i.e., the anonymous user of the VoIP telephone having the device address 919-555-1234), and where access device location can be used to establish a relationship with other access devices (e.g., access devices within a room, access devices within a prescribed distance of each other, etc.). In this case, relationships can be established based on an anonymous user accessing the network 20 using various access devices 21, 27, 31 that are known to be located at the same office desk.

Hence, use of the term "user" is applicable to both a "registered user" (having registered according to step 60), and an "anonymous user" that has not registered his or her personal identity, but rather relies on the access device address to establish the user identity 54.

The context correlation resource 26 registers in step 62 with the various access devices, for example based on registering an Application Programming Interface (API) 64 with each of the devices. For example, exemplary API commands for use by the information sources 22 on behalf of the context correlation resource 26 via the API 64 may include commands such as download all log entries identifying prior device-specific accesses by the user to chosen destinations (synchronize chosen destinations), notify context correlation resource 26 upon detection of any updates to the information context (e.g., user storing or modifying a file in the network 22), notify context correlation resource 26 upon detection of user accessing a chosen destination 32.

Consequently, the registration by the context correlation resource 26 with the information sources 22 causes each information source 22 to not only present the chosen destination 32 to a user, but also to notify the context correlation resource 26 when the user is presented with the information (i.e., the chosen destination 32). Alternatively, if the AONS server 24 is implemented in the network 20, use of API registration may be unnecessary: the AONS 24 is configured for monitoring all data packets traversing the network and associating the packets with applications using the packets, resulting in an intelligent management of transactions. Hence, since the AONS 24 tracks network activity and knows the information that is being sought by a user, the AONS 24 can independently update the relationships 36 in the connection context storage 28 based on detecting the artifacts in the form of packets sent to and from the user device.

Assume in step 66 that the context correlation resource 26 receives the user context based on the user of the user device having registered with the context correlation resource 26 to establish user identity 54, and entering a search string as the initial search context 52. As described previously, the context correlation resource 26 may be implemented as an executable software resource locally within the user's device, or remotely as part of a web server providing search services. The context correlation resource 26 applies in step 68 the user context 50 as a filter onto the information context 48 in order to obtain the portion 55 of the information context 48 that is relevant to the user context 50. As recognized in the art, the filtering of the information context 48 may be based on sending queries to available information context of sources, or retrieving cached filter results. The context correlation resource 26 also applies the user context 50 in step 70 as a filter onto the connection context 38 in order to obtain the portion 56 of the connection context 38 that is relevant to the user context 50.

The context correlation resource 26 orders in step 72 the information search results 55 with the connection search results 56, resulting in the ordered list of 42 of likely destination targets, including the data objects 46 and the identified individuals 44. As indicated in step 72, the context correlation resource 26 also may insert artifact tags (e.g., D1, D2) for identifying each destination target 44, 46, as well as an artifact tag (e.g., U1) for identifying the original user context 50 having generated the search result 42. If in step 74 the user modifies or refines the user context 50 (U1), for example by refining the search context 52 (U2) or forwarding the search results to another user who inherits the search results but uses a different identity 54, the context correlation resource 26 repeats the search operations based on the updated user context (e.g, U1U2).

Assume that the user does not modify the search results in step 74, but rather performs a destination choice (D1), for example either selecting a hyperlink within the search result 42, or by initiating a connection via a registered access device to a destination (e.g., calling an individual using a voice over IP telephone). As noted previously, each of the access devices are configured for notifying the context correlation resource 26 with a message (i.e., artifact) in response to detecting an access by the user to the chosen destination according to the corresponding prescribed protocol (step 76). Hence, in the case of a voice over IP telephone call, the call manager 22 will specify the user initiating the phone call, the destination party (or phone number), the time the phone call was initiated, and possibly other attributes such as duration of the call, and whether the call was transformed into a telephone conference, etc. Other attributes also may include identifying whether the call record was stored as a transcript at a specified location. In the case of the user responding to a web-based query, the artifacts identifying the search result 42 and the chosen link to the chosen destination may be sent to the context correlation resource 26 as part of the HTTP post by the user in accessing the chosen destination via the search results.

In either case, the context correlation resource 26 adds the destination choice artifact (D1) in step 78 to the connection context 38, enabling the correlation of the relationship 36 between the user context (U1) 40 and the chosen destination (D1) 32a to be adjusted accordingly.

The relationship 36 between chosen destinations 32b and 32c, or between prior search contexts 40 and chosen destinations 32a, can be established and updated by numerous methodologies. For example, the context correlation resource 26 or the AONS 24 may identify that the same user accessed the chosen destinations 32b and 32c within a measured time interval: the time interval between the user accessing the chosen destinations 32b and 32c in this example provides the correlation (i.e., the logical distance) that defines the relationship 36 between the chosen destinations 32b and 32c. As described previously, access of the chosen destinations 32b and 32c by the same user within a measured time interval may have been performed by distinct and independent access devices 21, 27, or 31.

Although a single instance of the relationship 36 between the chosen destinations 32b and 32c illustrates a relatively weak correlation, subsequent iterations between the chosen destinations, especially by different users over time, may in fact strengthen the relationship 36 between the chosen destinations. Hence, strong correlations may be established based on detecting numerous instances by different users, where each user, upon accessing the chosen destination 32b (e.g., an e-mail), within a short time interval (e.g., 5 seconds) accesses the chosen destination 32c (e.g., an engineer not identified in the e-mail); consequently, over time a strong correlation may be established that identifies that the chosen destination 32c is important in any access of the chosen destination 32b, such that any search for the chosen destination 32b should include the chosen destination 32c as a target destination.

Other techniques of establishing a relationship may include pattern recognition between different chosen destinations, or any other metric that enables the correlation of the relationship to be expressed as a logical distance between the two chosen destinations.

FIG. 6 is a diagram illustrating search results 42 generated by the context correlation resource 26 in the form of an ordered list of destination targets, according to an embodiment of the present invention. The search results 42 include the ordered list of destination targets including a hyperlink 82 for accessing user profile information for an individual, a hyperlink 84 for initiation of an IP telephone call to the identified individual, a hyperlink 86 for identifying meeting availability for the given individual, hyperlinks 88 for sending a message to an individual according to respective device protocols, hyperlinks 90 for accessing stored documents related to the individual, and hyperlinks 92 for accessing stored messages related to the individual. The hyperlinks 90 and 92 are examples of destination targets for data objects 46, and the hyperlinks 82, 84, 86 and 88 are examples of address identifiers 44 for reaching the identified individual.

According to the disclosed embodiment, a search result is presented as an ordered list of destination targets, including selected identified individuals and selected data objects that are determined as relevant to the user context, including destinations having been chosen independent of any search result. Consequently, the search result reflects associations having been established by users based on user actions independent of access device, without the necessity of any manual entry or modification of database records.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for searching a system, the method including:
   receiving by a processor based device a user context that identifies a search context relative to a personal identity of an individual seeking a search result;
   identifying by the processor based device a portion of a connection context as relevant to the user context, the connection context identifying relationships between chosen destinations accessible via information sources that are reachable via a network, the chosen destinations including data objects and address identifiers for identified individuals having respective personal identities, each of the relationships having a strength increased by an aggregation of artifacts recorded in the network by the system and that represent accessing of at least a corresponding first and second of the chosen destinations by different individuals having different personal identities, each artifact identifying the corresponding personal identity and the corresponding chosen destination, at least one of the relationships established based on a determined correlation between a first and a second of the artifacts recorded within a time interval, the first artifact recorded in response as a first of the individuals accesses the first chosen destination using a first available user device and the second artifact recorded in response as the first individual accesses the second chosen destination using a second available user device distinct and independent from the first available user device, the strength of the one relationship increased by the aggregation of the associated artifacts, representing the accessing of the first and second chosen destinations by the different individuals, relative to the respective determined correlations; and
   generating by the processor based device as the search result an ordered list of destination targets, including selected identified individuals identified based on their respective personal identities, including ordering the ordered list according to the portion of the connection context;
   wherein the first and second available user devices are at a same location.

2. The method of claim 1, further comprising identifying the selected identified individuals, relevant to the user context, from an information context identifying destinations in the system that are accessible by the individual.

3. The method of claim 2, wherein the selected identified individuals specified in the ordered list of destination targets provide, for a given identified individual, a link to any one of: user profile information of the given identified individual, initiation of an IP Phone call to the given identified individual, meeting availability for the given identified individual, sending a message to the given identified individual, accessing stored messages related to the given identified individual, or accessing stored documents related to the given identified individual.

4. The method of claim 1, wherein the generating includes inserting within the search result the user context for submission thereof in response to any search refinement of the search result by the individual seeking the search result, the method further comprising updating the search context of the user context into an updated search context in response to a detected artifact indicating a new chosen destination by the individual following the search result, the updated search context reflecting the new chosen destination relative to the new chosen destination.

5. The method of claim 4, further comprising generating a second search result that includes updating the updated search context to a second updated search context in response to subsequent detected artifacts indicating refinements of the search result.

6. The method of claim 1, wherein a subset of the artifacts identify destinations having been chosen independent of any search result.

7. The method of claim 1, further comprising:
   following generation of the search result, receiving artifacts from a system providing services to the user independent of the search result, the artifacts identifying chosen destinations not having been specified as destination targets in the search result; and
   updating selected relationships identified by the connection context based on the received artifacts.

8. The method of claim 1, wherein each relationship is updated in response to the recording of the associated artifacts for any of the different individuals.

9. An apparatus for searching a system, the apparatus comprising:
   a processor; and
   memory coupled to said processor and having stored thereon instructions that when executed by the processor causes the processor to execute operations comprising:
   receiving a user context that identifies a search context relative to a personal identity of an individual seeking a search result,
   identifying a portion of a connection context as relevant to the user context, the connection context identifying relationships between chosen destinations accessible via information sources that are reachable via a network, the chosen destinations including data objects and address identifiers for identified individuals having respective personal identities, each of the relationships having a strength increased by an aggregation of artifacts recorded in the network by the system and that represent accessing of at least a corresponding first and second of the chosen destinations by different individuals having different personal identities, each artifact identifying the corresponding personal identity and the corresponding chosen destination, at least one of the relationships established based on a determined correlation between a first and a second of the artifacts recorded within a time interval, the first artifact recorded in response as a first of the individuals accesses the first chosen destination using a first available user device and the second artifact recorded in response as the first individual accesses the second chosen destination using a second available user device distinct and independent from the first available user device, the strength of the one relationship increased by the aggregation of the associated artifacts, representing the accessing of the first and second chosen destinations by the different individuals, relative to the respective determined correlations, and generating as the search result an ordered list of destination targets, including selected identified individuals identified based on their respective personal identities, including ordering the ordered list according to the portion of the connection context, the apparatus implemented as a processor-based device;

wherein the first and second available user devices are at a same location.

10. The apparatus of claim 9, wherein the memory further has instructions that when executed includes identifying the selected identified individuals, relevant to the user context, from an information context identifying destinations in the system that are accessible by the individual.

11. The apparatus of claim 10, wherein the selected identified individuals specified in the ordered list of destination targets provide, for a given identified individual, a link to any one of: user profile information of the given identified individual, initiation of an IP Phone call to the given identified individual, meeting availability for the given identified individual, sending a message to the given identified individual, accessing stored messages related to the given identified individual, or accessing stored documents related to the given identified individual.

12. The apparatus of claim 9, wherein the memory further has instructions that when executed includes inserting within the search result the user context for submission thereof in response to any search refinement of the search result by the individual seeking the search result, and updating the search context of the user context into an updated search context in response to a detected artifact indicating a new chosen destination by the individual following the search result, the updated search context reflecting the new chosen destination relative to the new chosen destination.

13. The apparatus of claim 12, wherein the memory further has instructions that when executed includes generating a second search result that includes updating the updated search context to a second updated search context in response to subsequent detected artifacts indicating refinements of the search result.

14. The apparatus of claim 9, wherein a subset of the artifacts identify destinations having been chosen independent of any search result.

15. The apparatus of claim 9, wherein the memory further has instructions that when executed includes:
following generation of the search result, receiving artifacts from a system providing services to the user independent of the search result, the artifacts identifying chosen destinations not having been specified as destination targets in the search result; and
updating selected relationships identified by the connection context based on the received artifacts.

16. The apparatus of claim 9, wherein each relationship is updated in response to the recording of the associated artifacts for any of the different individuals.

17. A non-transitory computer readable storage medium having stored thereon sequences of instructions for searching a system by a processor based device, the sequences of instructions including instructions for:
receiving by the processor based device a user context that identifies a search context relative to a personal identity of an individual seeking a search result;
identifying by the processor based device a portion of a connection context as relevant to the user context, the connection context identifying relationships between chosen destinations accessible via information sources that are reachable via a network, the chosen destinations including data objects and address identifiers for identified individuals having respective personal identities, each of the relationships having a strength increased by an aggregation of artifacts recorded in the network by the system and that represent accessing of at least a corresponding first and second of the chosen destinations by different individuals having different personal identities, each artifact identifying the corresponding personal identity and the corresponding chosen destination, at least one of the relationships established based on a determined correlation between a first and a second of the artifacts recorded within a time interval, the first artifact recorded in response as a first of the individuals accesses the first chosen destination using a first available user device and the second artifact recorded in response as the first individual accesses the second chosen destination using a second available user device distinct and independent from the first available user device, the strength of the one relationship increased by the aggregation of the associated artifacts, representing the accessing of the first and second chosen destinations by the different individuals, relative to the respective determined correlations; and
generating by the processor based device as the search result an ordered list of destination targets, including selected identified individuals identified based on their respective personal identities, including ordering the ordered list according to the portion of the connection context:,
wherein the first and second available user devices are at a same location.

* * * * *